Patented Mar. 1, 1938

2,109,961

UNITED STATES PATENT OFFICE 2,109,961

LIQUID SPREADER AND STICKER

Errol Hay Karr, Yakima, Wash., assignor to Yakima Valley Spray Company, Yakima, Wash., a corporation of Washington No Drawing. Application July 9, 1935, Serial No. 30,561

4 Claims. (Cl. 167—42)

This invention relates to the use of liquid spreaders and stickers in combination with insecticides such as arsenate of lead, cryolite, zinc arsenite, or in oil spray combinations. An object of the invention is to provide a spreader and sticker which when used with finely divided particles of an insecticide in proper solution with water will cause flocculation of the insecticide and when the spray combination is applied will deposit a heavy uniform coverage of the insecticide on fruit trees, plants, or shrubs on which it is sprayed.

Another object of the invention is to provide a spreader and sticker which will cause a heavy flocculation of the insecticide when mixed properly with water in a spray solution.

Another object is to provide a spreader and sticker which is soluble in cold water, consequently making its use and application simple and convenient.

Another object is the method for producing the spreader and sticker embodying the other objects, and a further object is to provide an insecticide spray in which a greater portion of the active insecticide is retained on the surface sprayed.

Under ordinary spraying conditions a certain amount of spray solution runs off or drips off the fruit and foliage causing a loss or waste of the insecticide in the run-off. This improved spreader and sticker, as a result of its flocculating and sticking qualities, brings about a run-off which is practically clear water. Thus the greater portion of the powdered insecticide in spray solution is deposited on the fruit and foliage, resulting in an almost negligible loss of insecticide in the run-off.

The spreader and sticker employed is prepared by saponifying a fish oil, herring, dog-fish, salmon, sardine, whale or the like. The saponifying agent is preferably potassium hydroxide but other saponifying agents may be used to advantage.

The fish oil is prepared by heating to low boiling for a period of 15 to 30 minutes. The object of the boiling is to dissolve all fat particles and break down sluggish protein compounds. After this is accomplished the oil is allowed to cool to the neighborhood of 60 to 70° C. at which time a saponification number test is run on the oil and the amount of alkali to be used calculated. The alkali to be used is dissolved in just sufficient water and added to the oil in the correct amount as determined by the saponification number test. The two substances are thoroughly mixed and the saponification begins to take place. The mixture becomes cloudy and a curdled precipitate is formed. If allowed to set 10 or 15 minutes, it will settle out, leaving a clear solution of unsaponified oil on top. After the initial reaction takes place, an alcohol is added to the mix and the whole continually stirred. On the addition of the alcohol, the mixture becomes dark in appearance and heat is generated. Eventually a jelly-like mass begins to form and in a short while the mixture becomes a completely gelled body. The amount of alcohol added is just enough to produce gelation. The amount required is dependent on the amount of water employed in bringing the saponifying agent into solution. If too much water is used for this solution, gelation may not always be satisfactory.

It has been found that a colloidal spreader and sticker is produced with water only when the concentrations of the water are kept sufficiently low. It is important to have at least as much alcohol body by weight as of water used in the saponifying solution. If desired the alcohol can be added to the saponifying solution and this in turn added to the hot fish oil, but the preferred form is to add the alcohol to the mix as described.

Of the saponifying agents experiments have shown that the potassium hydroxide produces a superior product for this purpose. The potassium salts produce a soft gel while sodium salts yield solid gels which become colloidal sooner than the corresponding potassium soaps.

Fish oils are preferred in preparing the spreader and sticker because by actual experiment they have proven to produce a product of superior quality. In view of the fact that the object of the saponification is not to produce a detergent or an insecticide but merely a flocculator spreader and sticker base for an insecticide solution the choice of fish oil will become more apparent. A further advantage to the use of fish oils is that they are relatively inexpensive. Fish oils such as herring, dog-fish and sardine belong to the oleic acid series and exhibit increasing ease of gelation with an increase in the height of the gelling alcohol in the aliphatic series.

Ethyl alcohol is the most practical for the promotion of gelation since it is prompt in reaction, readily obtainable and economical to use. The other alcohols in the series, methyl, propyl, butyl, amyl, and the other members in the ascending series are of value in the gelation process but are less practical from an economical standpoint.

The following is an example of the preparation of a batch of the spreader and sticker compound. The figures are those for the average formula in preparing a small batch:

| | Pounds |
|---|---|
| Herring fish oil | 500 |
| Potassium hydroxide | 85 |
| Water | 83 |
| 95% ethyl alcohol | 85 |
| Total weight of spreader and sticker jelly | 753 |

The 500 lbs. of herring fish oil is heated in a vessel to low boiling and held at this temperature for 15 to 30 minutes. It is then allowed to cool to 60 to 70° C. 85 lbs. of potassium hydroxide are dissolved in 83 lbs. of water. The saponification number test is then run to determine the required amount of potassium hydroxide. The amount as determined is then added to the hot fish oil with constant stirring and after it is thoroughly mixed 85 lbs. of 95% denatured ethyl alcohol is added with continued stirring. Almost immediately after the addition of the alcohol the mixture will darken in color and begin to gel. The same result may also be obtained by adding the alcohol first to the hot fish oil and adding the caustic solution last with the production of heat.

Within about 12 hours the mass will become cool enough for the preparation of a desired strength of solution of the liquid spreader and sticker. The jelly-like mass is transferred to the dissolving tank which contains about 210 gallons of hot water and agitated to disperse the gel and produce the desired strength solution. One pint of this finished solution is then added to each 100 gallons of water to cause satisfactory flocculation of finely divided particles of insecticides.

It is of course to be understood that the proportions will vary with different fish oils and even with different batches of the same oil. The amounts of water and alcohol are variable and up to twice the required amount of water may be used together with a corresponding increase in the gelling alcohol. The temperatures named, 60 to 70° C., may likewise be varied within the range required to produce active saponification and also limited to temperatures at which the reaction is not too violent. Thus, with the oil at 50° C. the reaction is satisfactory if the alkali be warmed before adding. At temperatures substantially above 70° there is danger of frothing and violent reaction by means of which losses of product may be had.

In general, the product is a soap alcohol, meaning the submolecular dispersion into each other of the saponified product and the alcohol, the final product possessing a satisfactory degree of the reciprocal of solubility.

The insecticide made up with this spreader and sticker base is characterized by an increase in the effectiveness of the insecticide. The spreader compound appears to act to cause the particles of insecticide to adhere to the surface upon which the solution is sprayed while permitting the body of the vehicle to flow off freely. Thus the drip off from a spray of this type is substantially composed of the vehicle.

What is claimed is:

1. A flocculator composed of a fish oil, caustic potash solution sufficient to saponify the oil, an alcohol in amount not less than the amount of water in the potash solution, and water in amount approximately 2½ times the weight of the other ingredients to dissolve the same.

2. A flocculator comprising by weight, 500 parts of a fish oil, aqueous potassium hydroxide solution in amount sufficient to saponify the oil, an alcohol in amount not less than the water in the potassium hydroxide solution, and 210 gallons of water dissolving the other ingredients.

3. An insecticidal composition composed of 100 gallons of a mixture of water and a substantially insoluble insecticidal ingredient, and 1 pint of a flocculator composition composed by ratio of 500 pounds fish oil, 85 pounds KOH, 83 pounds water, 85 pounds ethyl alcohol, and 210 gallons of water.

4. A liquid spreader and sticker containing fish oil 500 parts by weight, potassium hydroxide 85 parts by weight, water 83 parts by weight, and ethyl alcohol 85 parts by weight.

ERROL HAY KARR.